Aug. 21, 1934. E. G. SHINNER 1,970,774
COMBINED LAMP AND INSECT TRAP
Filed July 22, 1933 3 Sheets-Sheet 1
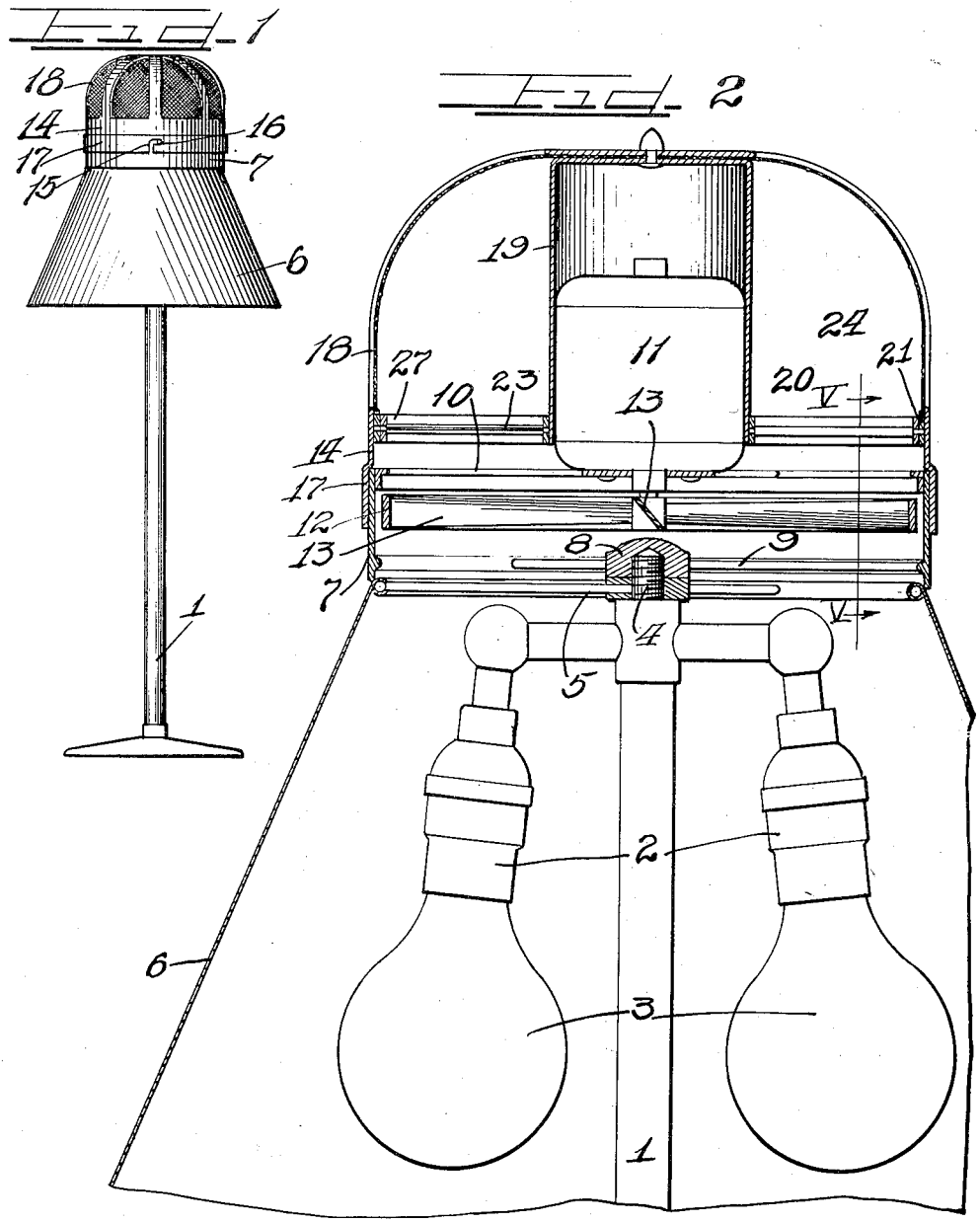
Inventor
Ernest G. Shinner.
by Charles H. Neil
Attys

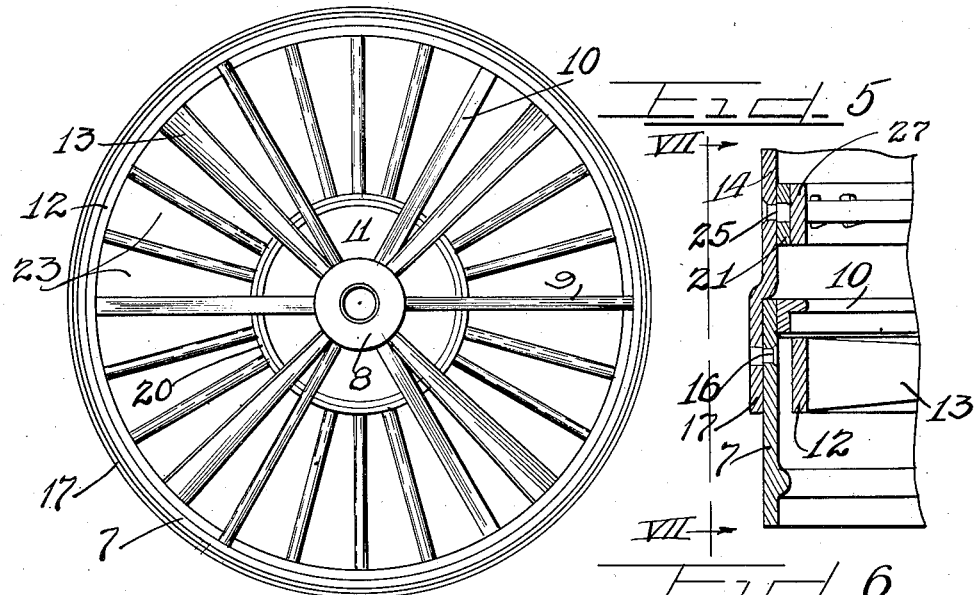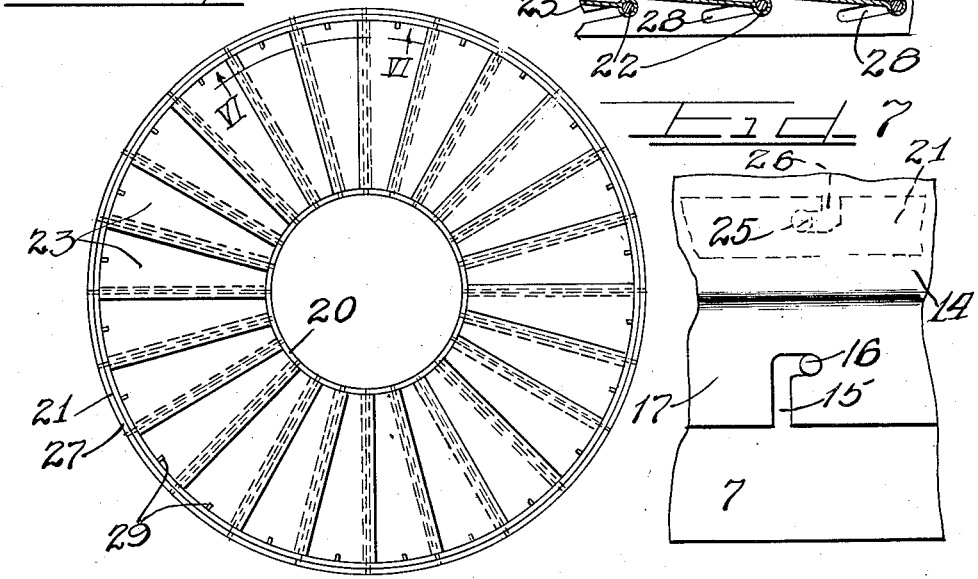

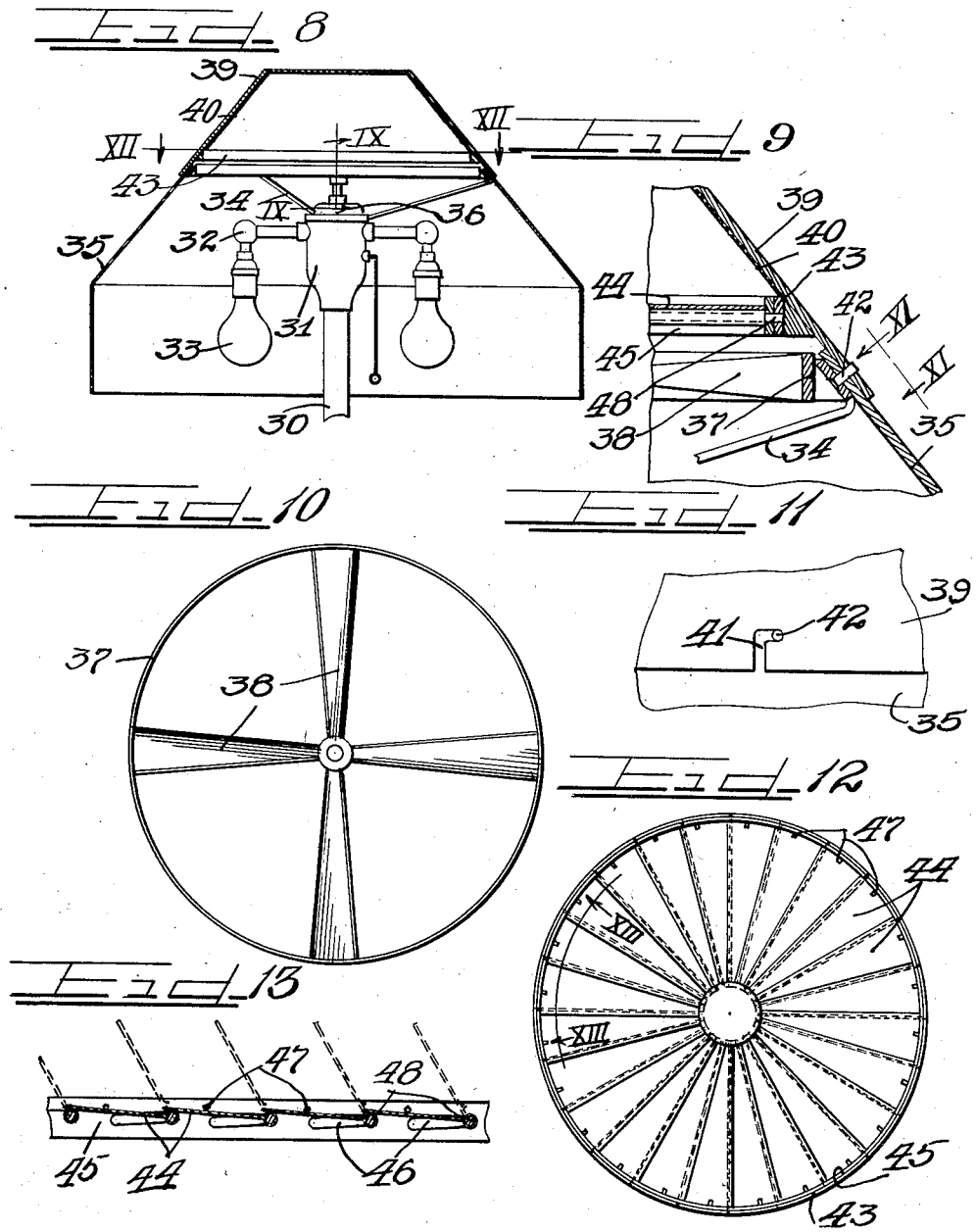

Patented Aug. 21, 1934

1,970,774

UNITED STATES PATENT OFFICE 1,970,774

COMBINED LAMP AND INSECT TRAP

Ernest G. Shinner, Chicago, Ill.

Application July 22, 1933, Serial No. 681,678

2 Claims. (Cl. 43—139)

This invention relates to an improved type of an insect trap for use in combination with an illuminated device or with an insect attracting means whereby insects after being attracted by a light or the attracting means are brought into the field of operation of a suction or blower mechanism and impelled in the direction of their flight through valve controlled entrances to be trapped in a receiving chamber from which escape is impossible.

It is an object of this invention to provide a combination lamp having a removable insect trap engaged thereon with the lamp serving as an enticing medium for drawing insects into the field of attraction of the trap.

It is also an object of this invention to provide an insect trap having a light associated therewith for the purpose of attracting insects into the path of force of a suction means or blower for forcing the insects into a trap chamber.

It is a further object of this invention to provide an insect trap having a light source associated with an air circulating means for impelling insects attracted by the light source into the trap.

It is furthermore an object of this invention to provide an insect trap with a source of light to attract insects in the direction of an entrance valve forming part of the trap to permit air circulating means to open the valve and impel the attracted insects into a trap chamber.

Another object of the invention is to provide a combination device including a lamp, a fan, and an insect trap with the fan serving as a means for opening the trap and creating an air circulation for impelling insects attracted by the lamp into a trap chamber when the fan is in operation.

It is an important object of this invention to provide a lamp with a removable trap unit including an air circulating means adapted to serve as a ventilating means, as a medium for operating entrance valves of the trap and as a force whereby insects attracted by the lamp are carried through the entrance valves into a trap chamber in which the insects are forcibly detained by the draft through the trap when the air circulating means is operating, said trap having the entrance valves thereof constructed to close automatically when the air circulating means is stopped so that the entrapped insects cannot escape.

Other and further important objects of this invention will be apparent from the disclosures in the specification and the accompanying drawings.

The invention (in a preferred form) is illustrated in the drawings and hereinafter more fully described.

On the drawings:

Figure 1 is an elevational view of a combined lamp and insect trap embodying the principles of this invention.

Figure 2 is an enlarged fragmentary vertical central section of the combined lamp and insect trap showing parts in elevation.

Figure 3 is a bottom plan view of the trap unit removed from the lamp.

Figure 4 is a top plan view of the valve section of the trap unit removed from the housing section and illustrating the butterfly valves locked in closed position.

Figure 5 is an enlarged fragmentary detail section taken on line V—V of Figure 2.

Figure 6 is a detail section taken on line VI—VI of Figure 4 illustrating the butterfly valves locked in closed position by means of the latching pins on the slotted lock ring.

Figure 7 is a fragmentary detail view taken on line VII—VII of Figure 5.

Figure 8 is a vertical central section through the upper portion of a modified form of combined lamp and insect trap with parts illustrated in elevation.

Figure 9 is an enlarged fragmentary detail section taken on line IX—IX of Figure 8.

Figure 10 is a plan view of the fan or blower wheel.

Figure 11 is a fragmentary detail view taken on line XI—XI of Figure 9.

Figure 12 is an enlarged plan view of the butterfly valve mechanism in closed position taken on line XII—XII of Figure 8.

Figure 13 is an enlarged fragmentary detail section taken on line XIII—XIII of Figure 12 illustrating the open position of the butterfly valve blades in dotted lines.

As shown on the drawings:

The reference numeral 1 indicates a lamp base or stand having lamp sockets 2 supported near the upper end thereof for the reception of light bulbs 3. Projecting from the upper end of the stem of the lamp base is a screw bolt 4 over which is removably engaged the apertured ring forming part of a lamp shade supporting spider 5. A lamp shade 6 of any desired design or shape is supported in place by means of the lamp shade spider or holder 5 to enclose the lamp sockets 2 and the bulbs 3 in the customary manner.

Removably supported upon the upper end of the lamp on the screw bolt 4 is a combination blower and trap unit arranged to permit the trap section to be removably engaged with the blower section as hereinafter more fully described.

The blower section comprises a body band or ring 7 having secured in the lower end thereof a supporting spider comprising a nut member 8 and radiating spokes 9 connecting the nut member to the inner surface of the ring. As clearly illustrated in Figure 2, the nut member 8 is threaded onto the screw bolt 4 to serve as a means for holding the shade in position as well as the housing or ring member 7 forming part of the blower section. Secured in the upper end of the ring 7 is a supporting frame or spider 10 on which a blower or fan motor 11 is centrally supported. The motor shaft projects downwardly through the supporting bracket 10 into the chamber provided by the ring 7 and has secured thereon a rotatable blower or suction wheel comprising a rim 12 and a plurality of radially disposed blades 13. The motor 11 is provided with a suitable control switch for permitting the same to be operated or turned off independently of the switch controlling the lights 3. The blower body ring 7 as shown in Figure 2, when in position, is adapted to seat against the upper end of the lamp shade 6 to contact the same and close the upper end of the lamp shade so that when the motor is in operation the fan wheel will cause a draft of air to be circulated upwardly through the lamp shade and through the ring 7 to cause an upward suction or a blowing action to take place upwardly through the lamp shade and said ring into the trap section which will now be described.

The trap section of the device comprises a dome or housing 14 including a base ring having bayonet slots 15 provided therein for the purpose of being removably engaged on pins 16 projecting from the ring 7 forming part of the blower section. The bayonet slots are provided in a slightly enlarged rim or ring 17 integrally formed on the lower end of the trap dome or housing 14. The trap dome or hood 14 is provided with a plurality of openings which are closed by means of screens 18. Secured centrally within the trap dome 14 is a cylindrical case or box 19, the upper end of which is closed and is rigidly secured to the inner surface of the top of the dome while the lower end of the box 19 is open to permit the same to fit over the motor 11.

Forming a part of the trap section is a valve unit comprising an inner ring 20 and an outer ring 21 which are connected by means of a plurality of radially disposed rods or shafts 22 (Figure 6) on which butterfly valves or gate valves 23 are pivotally mounted and are so positioned that when the same are closed by the action of gravity said valves overlap one another to close the entrance to the trap chamber 24. For the purpose of holding the valve unit engaged in the hood 18 the hood is provided with a plurality of inwardly projecting pins 25 which are adapted to be engaged in bayonet slots 26 provided in the outer ring 21 as clearly illustrated in Figure 7. For the purpose of locking the valves 23 in closed position as illustrated in Figure 6, a locking ring 27 is provided adjacent the inner surface of the outer valve ring 21. The control ring 27 is provided with a plurality of inclined slots 28 through which the valve supporting rods or shafts 22 project. Projecting inwardly from the inner peripheral surface of the control ring 27 are a plurality of locking pins 29 which when the control ring is shifted into the position illustrated in Figure 6 engage the closed butterfly valves 23 to hold the same locked in closed position. The control ring 27 is accessible to permit adjustment thereof for the purpose of locking the valves in closed position when the trap hood 14 is removed from the ring 7.

Figures 8 to 13 inclusive illustrate a modified form of combined lamp and insect trap in which the reference numeral 30 indicates a standard or stem of a lamp. Secured on the upper end of the lamp stem 30 is a fixture box or canopy 31 on which socket brackets 32 are supported. Engaged in the socket brackets are light bulbs 33. Supported on the upper end of the fixture box 31 is the supporting frame 34 of a lamp shade 35.

Supported on the upper end of the fixture box 31 and the lamp shade 35 is a combination blower and insect trap unit consisting of a blower or air circulating means and a trap section removably engaged therewith.

The blower section comprises a motor 36 which is supported in the upper end of the fixture box 31 with the motor shaft projecting upwardly and having secured thereon a blower or air circulating wheel comprising a rim 37 and a plurality of radial blades 38. The motor 36 for rotating the blower wheel is provided with a separate control switch (not shown) for starting and stopping the motor independently of the switch which controls the lights.

The trap unit which is removably engaged on the upper end of the lamp shade 35 comprises a housing, dome or hood 39 closed at the upper end and open at the lower end, and having a plurality of peripheral openings therein closed by means of screens 40. The lower margin of the trap housing 39 is provided with a plurality of bayonet slots 41 arranged to engage retaining pins 42 projecting from the upper end of the lamp shade 35 whereby the trap unit may be removably engaged on the lamp shade to enclose the blower mechanism.

Removably secured in the trap housing 39 near the lower open end thereof is a control valve mechanism comprising a ring frame 43 having a plurality of gravity controlled butterfly or gate valves 44 radially arranged in the ring 43 and adapted when closed, as illustrated in full line in Figure 13, to overlap one another to close the entrance end of the trap housing 39.

For the purpose of holding the valves 44 locked in closed position, a valve control ring 45 is rotatably or shiftably supported within the valve ring 43. The control ring 45 is provided with a plurality of slots 46 through which the supporting shafts or rods 48 of the valves 44 project as clearly illustrated in Figure 13. Projecting inwardly from the inner peripheral surface of the control ring 45 are a plurality of locking pins 47. For the purpose of disengaging the valve mechanism from the trap housing 39, the valve ring 43 is provided with a plurality of spaced bayonet slots for removable engagement over supporting pins projecting inwardly from the interior surface of the lower portion of the trap housing 39 similar to the arrangement illustrated in dotted lines in Figure 7.

The operation is as follows:

In the assembled form of the combined lamp and insect trap as illustrated in Figure 1 of the drawings, both the blower or air circulating section and the trap section are mounted in interfitting relation upon the top of the lamp shade 6. To rid a room or an enclosed area of bothersome insects, it is only necessary to turn on the lamp to light the bulb 3, which when lighted, serve as a medium for attracting the insects into the lamp shade around the bulbs. The motor 11 is then started causing the rapid rotation of the blower wheel to start up an air draft or air circulation upwardly through the lamp shade 6 and through the blower housing or ring 7 toward the trap unit. The upward current of air through the lamp created by the blower mechanism produces a forced draft upwardly against the closed valves 23 to automatically swing the valves upwardly into open position, with the control ring 27, of course, being in a released position with the locking pins 29 moved into their retracted positions so as not to interfere with the opening of the valves.

The insects which are attracted into the lamp shade 6 flying toward the light are caught in the upwardly directed forced air current and are carried or impelled by force in the direction of their flight upwardly through the field of operation of the rotating draft creating mechanism, and are blown upwardly through the open valves into the trap chamber 24 and are there held imprisoned pressed against the inner walls of the trap housing by the force of the currents of air which pass through the trap housing and escape through the screened openings thereof.

When the trap is full of insects or after the insects in a room have been trapped, the motor 11 is shut off thereby stopping the circulation of air through the lamp and permitting the action of gravity to automatically close the control valves 23 to shut the lower end of the trap housing to prevent the escape of the entrapped insects.

By slightly rotating the trap housing or dome 14, the trap is removed from the retaining pins 16 and the attendant or operator now has access to the control ring 27 which is slightly rotated to move the locking pins 29 into the locking positions illustrated in Figure 6 whereby the closed valves 23 are held locked in closed position preparatory to the emptying of the entrapped insects from the trap chamber 24.

When it is desired to empty the trap, the entire valve unit may be removed from the trap housing 14 by shifting the valve ring 21 to position the bayonet slots 26 so that the ring 21 may be disengaged from the retaining pins 25. With the valve unit removed, the contents of the trap chamber 24 may be readily disposed of.

In the modified form of the combined lamp and insect trap illustrated in Figures 8 to 13 inclusive, the operation is substantially the same as that hereinbefore described in connection with the device illustrated in Figure 1, except that in this modified form of the device the motor is secured in the fixture box 31 instead of being positioned to project upwardly into the casing 19 of the trap housing 14. In the modified form of the device, insects attracted into the lamp shade 35 are caught in the upwardly flowing current of air produced by the rotating blower blades 38 and are blown or impelled to pass into the trap housing 39 through the open valves 44 which are automatically blown open when the motor 36 is started.

When it is desired to empty the trap housing 39, the housing is removed from the upper end of the lamp shade 35 and the valves 44, which are closed by gravity when the blower mechanism is stopped, are adapted to be locked in closed position by slightly rotating the control ring 45 to move the locking pins 47 into position to engage the closed valves 44 as clearly illustrated in Figure 13.

In case it is not necessary to use the trap unit, the same may be removed leaving the air current mechanism in position at the upper end of the lamp shade. When the motor is started, the blower ring or fan mechanism is rotated to cause an upward draft or passage of air through the lamp shade and out through the upper end thereof thereby causing a forced circulation of air in the room in which the device is used.

In the form of the device illustrated in Figures 1 to 7 inclusive, both the blower mechanism and the trap sections may be removed from the lamp shade when desired.

While the trap unit is illustrated as being mounted on the upper end of a lamp shade, it will of course be understood that the device may be used equally as well on the lower end of a lamp shade or on lamp shades mounted in various positions.

The mounting of the air current producing unit on the lamp shade avoids the use of a separate electric fan for air circulation and, of course, saves the amount of space which ordinarily is occupied by an air fan. It will also be noted that in the construction described that the blower mechanism or air circulating unit serves a triple purpose that of producing air circulation, secondly, producing the required force for automatically opening up the trap valves, and finally, producing the impelling force for blowing the attracted insects with force into the trap chamber.

It will, of course, be understood that various details of construction may be varied through a wide range without departing from the principles of this invention, and it is therefore not the purpose to limit the patent granted hereon otherwise than necessitated by the scope of the appended claims.

I claim as my invention:

1. An insect attracting and trapping device comprising a lamp, a trap housing removably mounted thereon and having an entrance opening therein, a gravity controlled valve mechanism mounted in the entrance opening to close the trap housing, a rotatable control ring connected with the valve mechanism and including means for locking the valve mechanism when the control ring is rotated, blower means between the lamp and said trap housing, and driving means for operating the same to produce an air circulation through the trap housing and open the valve mechanism when the locking means is retracted by a reverse rotation of the control ring.

2. In a trap device of the class described the combination with a trap housing having an entrance opening therein, of a gravity controlled valve mechanism mounted in the entrance opening to close the trap housing, a slotted control ring engaged with the valve mechanism, pin members on the control ring for locking the valve mechanism when the control ring is rotated in the trap housing, blower means, and driving means for operating the same to produce an air current to force open the valve mechanism and create a draft through the trap housing when the control ring is rotated in a reverse direction to retract the pin members from locking engagement with the valve mechanism.

ERNEST G. SHINNER.